US010046916B1

(12) United States Patent
Massman et al.

(10) Patent No.: US 10,046,916 B1
(45) Date of Patent: Aug. 14, 2018

(54) VIBRATORY APPARATUS WITH STRUCTURAL RESILIENT MEMBER

(71) Applicant: General Kinematics Corporation, Crystal Lake, IL (US)

(72) Inventors: Steve Massman, Poplar Grove, IL (US); Vincent Brice, McHenry, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 0 days.

(21) Appl. No.: 15/432,564

(22) Filed: Feb. 14, 2017

(51) Int. Cl.
*B65G 27/20* (2006.01)
*B65G 27/26* (2006.01)
*B65G 27/02* (2006.01)
*B65G 27/08* (2006.01)
*B65G 27/04* (2006.01)

(52) U.S. Cl.
CPC ............. *B65G 27/08* (2013.01); *B65G 27/02* (2013.01); *B65G 27/04* (2013.01); *B65G 27/20* (2013.01); *B65G 27/26* (2013.01)

(58) Field of Classification Search
CPC ................................ B65G 27/20; B65G 27/26
USPC .................................................. 198/760, 767
See application file for complete search history.

(56) References Cited

U.S. PATENT DOCUMENTS

| | | | |
|---|---|---|---|
| 2,901,110 A | 8/1959 | Brumagin | |
| 4,007,825 A | 2/1977 | Spurlin et al. | |
| 4,795,025 A * | 1/1989 | Doke | B65G 27/08 198/763 |
| 5,024,320 A | 6/1991 | Musschoot | |
| 5,131,525 A | 7/1992 | Musschoot | |
| 5,934,446 A | 8/1999 | Thomson | |
| 6,029,796 A | 2/2000 | Musschoot | |
| 6,155,404 A | 12/2000 | Musschoot | |
| 6,298,978 B1 | 10/2001 | Rosenstrom | |
| 7,182,200 B2 * | 2/2007 | Narukawa | B65G 27/24 198/762 |
| 7,296,951 B2 | 11/2007 | Kraus et al. | |
| 7,540,694 B2 | 6/2009 | Markowski et al. | |
| 2002/0171330 A1 * | 11/2002 | Kato | B65G 27/08 310/328 |

(Continued)

FOREIGN PATENT DOCUMENTS

EP 0 288 706 11/1988

OTHER PUBLICATIONS

International Search Report and Written Opinion, counterpart application No. PCT/US2017/068753, dated Apr. 16, 2018 (11 pages).

*Primary Examiner* — Mark A Deuble
(74) *Attorney, Agent, or Firm* — Cook Alex Ltd.

(57) ABSTRACT

A vibratory apparatus includes a first mass comprising a first deck with a path of travel between a first point and a second point along the first deck, a second mass comprising a second deck with a path of travel between a first point and a second point along the second deck, a shaft coupled to the first mass and at least one eccentric weight coupled to the shaft, and at least one resilient member in the form of a plate having a thickness, the plate coupled at a first end to the first deck and at a second end to the second deck, the plate having a thickness disposed transverse to the path of travel along the first and second decks, the plate having at least one opening formed therethrough to form a web having a spring characteristic.

20 Claims, 4 Drawing Sheets

(56) References Cited

U.S. PATENT DOCUMENTS

2015/0336745 A1* 11/2015 Groenewald .......... B65G 27/12
  198/750.8
2016/0039613 A1    2/2016 Bott et al.

* cited by examiner

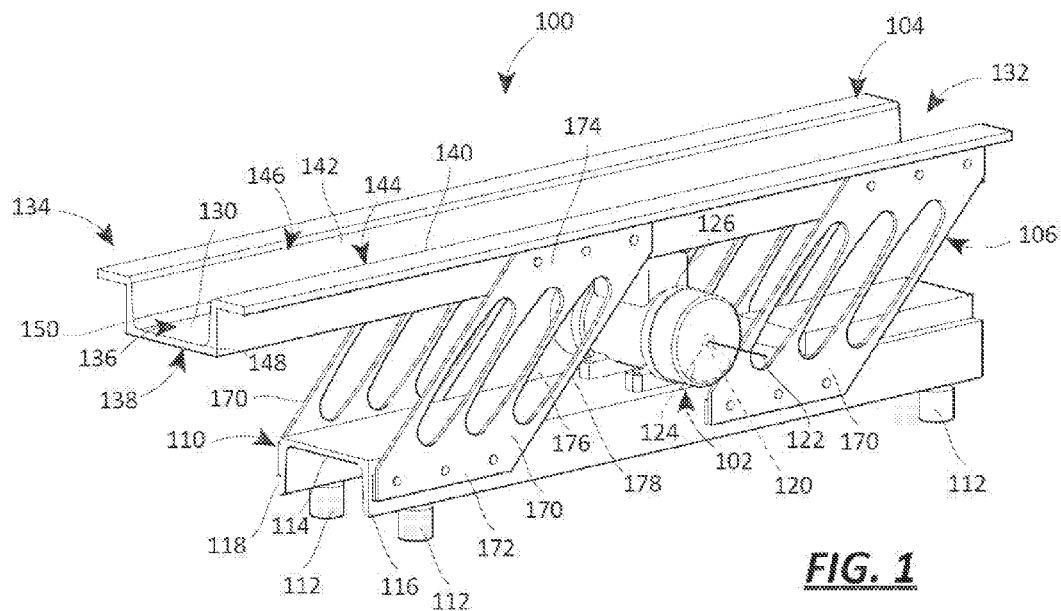

VIBRATORY APPARATUS WITH STRUCTURAL RESILIENT MEMBER

BACKGROUND

This patent is directed to a vibratory apparatus having a resilient member formed of a structural member and a method for manufacturing and operating a vibratory apparatus with a resilient member formed of a structural member.

It is not uncommon to use slat-type springs in the manufacture of a vibratory apparatus, such as a vibratory conveyor. For example, U.S. Pat. No. 5,131,525 illustrates an embodiment of a vibratory conveyor where the trough is carried on a plurality of vertical legs. As explained therein, because the legs are constructed of a dimension in the direction transverse to the path of conveyance much larger than a dimension (i.e., its thickness) in the direction along the path of conveyance, the legs are caused to act as resilient means of a leaf-spring type. This leaf-type spring permits displacement of the trough only in the direction of conveyance.

Such slat-type springs present certain disadvantages relative to other resilient members, or springs, such as coil springs. The slat-type springs are more difficult to connect to the trough, adding to the expense of the vibratory apparatus. Furthermore, there are higher localized stresses at the point of attachment for slat-type springs, which can increase the potential for early replacement. As a consequence, coil springs are used in many applications.

Coil springs present a separate set of issues, however. For example, because of the manufacturing processes used to make coil springs, not all materials can be used, because not all materials can be formed into coil springs using conventional manufacturing methods. Furthermore, coil springs typically are available only in standard sizes, causing issues should a non-standard sized spring be a more optimal solution for a particular apparatus. In addition, coil springs can present issues for installation/maintenance/replacement, considering that coil springs typically have a loop formed at either end, which loop can be difficult to reach using conventional tools.

It would be advantageous to overcome or substantially ameliorate one or more of the disadvantages of such existing springs, or at least to provide a useful alternative.

SUMMARY

According to one aspect of the present disclosure, a vibratory apparatus includes a first mass, a second mass, at least one of the first mass and the second mass having a deck with a path of travel between a first point and a second point along the deck, at least one resilient member in the form of a plate having a thickness, the plate coupled at a first end to the first mass and at a second end to the second mass with the thickness disposed transverse to the path of travel along the deck, the plate having at least one opening formed therethrough to form a web having a spring characteristic, a shaft coupled to one of the first mass and the second mass, the shaft having at least one eccentric weight coupled thereto, and a motor coupled to the shaft.

According to another aspect of the present disclosure, a vibratory apparatus includes a trough comprising deck with a path of travel between a first point and a second point along the deck, an exciter comprising a platform, and a shaft disposed on the platform with a shaft axis disposed transverse to the path of travel, and at least one eccentric weight coupled to the shaft, and at least one resilient member in the form of a plate having a thickness, the plate coupled at one end to the platform and at a second end to the deck, the plate having a thickness disposed transverse to the path of travel along the deck, and at least one opening formed therethrough to form a web having a spring characteristic.

According to a further aspect of the present disclosure, a vibratory apparatus includes a first mass comprising a first deck with a path of travel between a first point and a second point along the first deck, a second mass comprising a second deck with a path of travel between a first point and a second point along the second deck, a shaft coupled to the first mass and at least one eccentric weight coupled to the shaft, and at least one resilient member in the form of a plate having a thickness, the plate coupled at a first end to the first deck and at a second end to the second deck, the plate having a thickness disposed transverse to the path of travel along the first and second decks, the plate having at least one opening formed therethrough to form a web having a spring characteristic.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings is necessarily to scale.

FIG. 1 is a perspective view of an embodiment of a vibratory apparatus having a single deck;

FIG. 2 is a side view of the vibratory apparatus of FIG. 1;

DETAILED DESCRIPTION OF VARIOUS EMBODIMENTS

Figure 3:
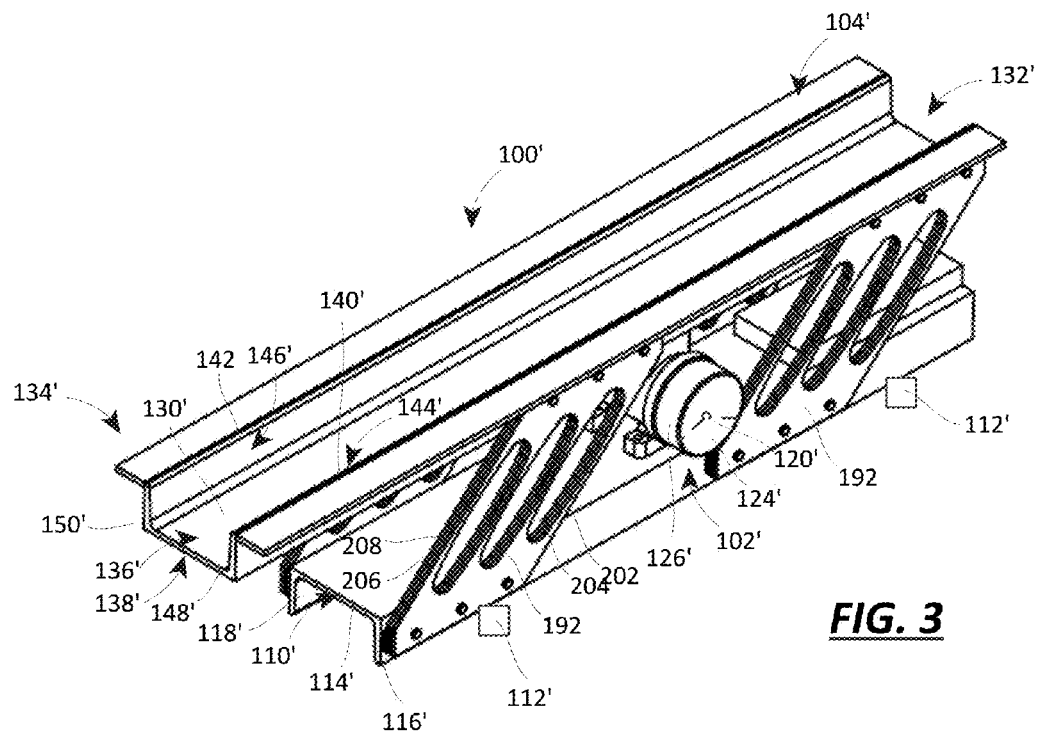
FIG. 3 is a perspective view of another embodiment of a vibratory apparatus having a single deck.

A single deck conveyor according to embodiments of the present disclosure is illustrated in FIGS. 1-4.

The embodiment of a single deck apparatus 100 of FIGS. 1 and 2 is a two-mass vibratory apparatus, including a first mass (or exciter) 102 and a second mass (or trough) 104. Connected between the first mass 102 and the second mass 104 are a number of resilient members 106 (or reactor springs), which are formed from structural elements of the apparatus 100. While the embodiment of the single deck apparatus 100 of FIGS. 1 and 2 is a two-mass feeder, the embodiments of this disclosure are not limited to feeders, but may be applicable to other types of vibratory apparatuses, such as conveyors, screens, shakeouts and the like.

The exciter 102 may include a base 110 that is supported on a reference surface. In particular, the base 110 may be supported on the reference surface by resilient members 112, such as coil springs or marshmallow springs, which resilient members or springs 112 may also be referred to as isolation members or springs. According to certain embodiments, the isolation members may be simply rubber pads. For the reasons provided below, the isolation springs 112 even may be omitted from embodiments of the present apparatus 100.

As best seen in FIG. 1, the base 110 may include a platform 114 and first and second side walls 116, 118 that are coupled to the platform 114 along opposing edges of the platform 114. The platform 114 extends from a first end to a second end, and the side walls 116, 118 also extend or depend from the first end to the second end of the platform 114, although not all embodiments of the apparatus 100 necessarily require such side walls 116, 118 (e.g., the side walls 116, 118 may not extend or depend from the first end to the second end). The side walls 116, 118 are used to couple the exciter 102 to the trough 104 as explained below.

The remainder of the exciter 102 may be coupled, mounted or supported on the platform 114. For example, the exciter 102 may include a shaft 120 with a shaft axis 122 (see FIG. 1) that is disposed coupled to the platform 114 transverse to the path of travel along the trough 104 with one or more eccentric or eccentric weights 124 coupled to the shaft 120. According to certain embodiments, the shaft 120 is the shaft of an electric motor 126, which motor is coupled 126 (e.g., by fasteners) to the platform 114. According to other embodiments, the shaft 120 is coupled to a shaft of an electric motor, which motor is mounted off the apparatus (e.g., to the side of the apparatus).

It will be recognized that according to other embodiments, the exciter 102 may include a plurality of shafts, each with eccentric weights mounted thereon, with each of the shafts being defined by one of a plurality of motors. In addition, the motor (or motors) 126 may be electrically coupled to a controller 128 (see FIG. 2), which controller 128 may include a microprocessor and memory. The controller 128 may be configured (e.g., programmed) to control the operation of the motor 126 (and thus the shaft 120) to vary the motion of the material on the trough 104.

The trough 104 includes a deck 130, and to the extent the trough 104 is connected to the exciter 104 by the resilient members 106, it may be said that the deck 130 is connected to the exciter 104 by the resilient members 106. The deck 130 has a first end 132 and a second end 134, and material may be moved along the deck 130 with a path of travel between a first point and a second point, e.g., between the first and second ends 132, 134. The deck 130 may have opposing surfaces, which for ease of illustration may be referred to as a first, or top, surface 136 and a second, or bottom, surface 138 (see FIG. 1).

The top surface 136 of the deck 130 may be treated or may have one or more protective layers disposed thereon to protect the deck 130 as material is moved between the first and second ends 132, 134. As a further alternative, the deck 130 may have openings or passages that extend between the surfaces 136, 138 to permit the separation of material moving over the top surface 136 of the deck 130. Separation of materials may also be achieved with a deck 130 that is defined by spaced structures, such as fingers, that define openings between them and permit the passage of certain materials through the openings while retarding the passage of other materials therethrough.

In the illustrated embodiment, the first end 132 of the deck 130 is at substantially the same elevation as the second end 134 of the deck 130 relative to a reference surface (i.e., the deck is horizontal). The reference surface may be defined by a foundation, which in turn may be the ground story of a building or an upper story of such a structure. According to other embodiments, the first end 132 of the deck 130 may be above or below the second end 134 of the deck 130 (i.e., the deck 130 is tilted or sloped, for example to allow gravity to assist or retard motion of material along the deck 130).

The trough 104 may also include a first side wall 140 and a second side wall 142 extending or depending from the first end 132 to the second end 134, although not all embodiments of the apparatus 100 necessarily require such side walls 140, 142 (e.g., the side walls 140, 142 may not extend or depend from the first end 132 to the second end 134, or the springs 106 may be connected directly to the deck 130). The first and second side walls 140, 142 each have facing surfaces that with the surface 136 of the deck 130 define an open-topped volume (although according to certain embodiments, the trough 104 may also include a hood that closes or covers the open top). For example, the first side wall 140 has an inner-facing surface 144, and the second side wall 142 has an inner-facing surface 146, and the inner-facing surface 144 of the first side wall 140 faces (or opposes) the inner-facing surface 146 of the second side wall 142.

The deck 130 is disposed between the first and second side walls 140, 142 (when included, as illustrated) and is coupled to the first and second side walls 140, 142. In this regard, the deck 130 is said to be coupled to the side walls 140, 142 when the deck and side walls are directly connected or indirectly connected (for example, when the side walls 140, 142 are connected by cross-members and the deck 130 is connected to the cross-members). As illustrated in FIG. 1, the deck 130 has a first edge 148 that is coupled to the first side wall 140 (specifically, the inner-facing surface 144) and a second edge 150 that is coupled to the second side wall 142 (specifically, the inner-facing surface 146).

As also illustrated, the deck 130 is integrally connected to the first and second side walls 140, 142 so that the deck 130 and first and second side walls 140, 142 are part of a unitary (i.e. one-piece) assembly. The deck 130 and side walls 140, 142 may be formed as a unitary assembly by bending a single piece of metal to define the deck 130 and side walls 140, 142, for example. This need not be the case for all embodiments of the apparatus 100.

While the illustrated embodiment includes a deck 130 that defines a straight path between the first and second ends 132, 134, it is possible that the deck 130 be curved instead. To this end, the side walls 140, 142 may also be curved, to confine materials moving along the deck 130 to the curved path, although the materials may move along the deck 130 in a curved path without the need to include curved side walls 140, 142.

The apparatus 100 also includes a plurality of plates 170 disposed to a first side and a second side of the deck 130. A plate 170 is a thin sheet of metal or other material, which may be flat or two-dimensional in quality (i.e., planar) or may be shaped (e.g., curved) to be three-dimensional in quality. Where the plate 170 is three-dimensional, the plate 170 retains a thickness that is considerably smaller in dimension that the length and/or width of the plate 170. As illustrated, four plates 170 are arranged about the apparatus 100, one pair at the first end 132 and one pair at the second end 134 with one plate 170 of each pair disposed on either the first side or the second side of the deck 130 (and thus the trough 104).

The plates 170 are joined at a first end 172 to the exciter 102 (and in particular to one of the side walls 116, 118) and at a second end 174 to the trough 104 (and in particular to one of the side walls 140, 142). The plates 170 are joined to the exciter 102 and the trough 104 with fasteners (e.g., bolts/nuts, rivets, etc.), for example. The connection of the plates 170 to the sides 140, 142 of the deck 130 as illustrated may provide for a better transfer of forces between the exciter 102 and the trough 104, as the fastener (e.g. bolts) which may be used to join trough 104, exciter 102, and plates 170 together may perform better under the shear conditions created than in the compression/tension cycling created, for example, when slats are used and arranged transverse to the trough 104. In addition, a spacer may be disposed between the plates 170 and the exciter 102 or the trough 104. In particular, these spacers may be disposed between the first end 172 and the side walls 116, 118 of the base 110 and the second end 174 and the side walls 140, 142 of the trough 104.

As illustrated, the plates 170 have at least one opening 176 formed in through the plate 170. The opening 176 defines a plurality of webs 178 that join the exciter 102 to the trough 104. These webs 178 have a thickness that is disposed transverse to the path of travel of material along the deck 130 between the first end 132 and the second end 134. The thickness of the webs 178 is considerably smaller in dimension that the length and/or width of the plate 170. The webs 178 define the plurality of resilient members or springs 106 coupled between the trough 104 and base 110 (and thus the exciter 102).

As is also illustrated, the embodiment of FIGS. 1 and 2 has plates 170 with three openings 176 each. While other embodiments may use other shapes, each opening 176 of this embodiment is of a generally oval shape, having a major axis 180. The three openings 176 are arranged on the plate 170 with two of the openings disposed to the right and the left (as illustrated in FIG. 2) of a central opening. The major axes 180 of the three openings 176 are parallel to each other. The three openings 176 define two webs 178 on either side of the central opening, and two additional webs 178, one to the left of the leftmost opening and one to the right of the rightmost opening. The webs 178 have longitudinal axes between first and second ends 182, 184 that are substantially parallel to the major axes 180 of the openings 176.

The removal of the material from the plate 170 defines an embodiment with webs 178 that have a width in the plane of the plate 170 that is comparable in dimension to the thickness in the direction transverse to the path of travel of material along the deck 130 (although other embodiments may have other dimensions). Consequently, each of the webs 178 thus formed is substantially smaller in thickness and width than in length (i.e., the dimension in the direction along the longitudinal axis of the web 178 between the ends 182, 184). In addition, because of the oval shape of the openings 176, the illustrated webs 178 have ends 182, 184 that are larger in width than at the midpoint of the webs 178. In fact, as illustrated, the ends 182, 184 taper toward the midpoint of the web 178, although that may not be true of other embodiments. It fact, it will be recognized that the thickness of the plate 170 may be varied relative to a web 178 having a common (or identical) width to achieve certain spring characteristics, which could result in a family of springs with similar shape but differing spring rates. In addition or in the alternative, the web width may be varied to vary the spring characteristics, such as resultant rocking frequencies.

As is illustrated, each of the openings 176 and webs 178 is disposed at an angle to the path of travel of the materials along the deck 130 between the first end 132 and the second end 134. For example, the axes 180 are disposed at an angle to the path of travel of the materials along the deck 130, and similarly the longitudinal axes of the webs 178 between the ends 182, 184 would be so inclined. The specific angle of the openings 176 and the webs 178 need not be the same for other embodiments. For example, according to certain embodiments, the openings 176 and webs 178 may be oriented generally upright (i.e., perpendicular to the deck 130).

In the embodiment of FIGS. 1 and 2, the webs 178 are generally of the same shape between the ends 182, 184. According to other embodiments, the webs 178 formed by the openings 176 may have different shapes, such that each individual web 178 may even have a different shape. However, certain advantages may be associated with a plate having webs 178 of a similar size and shape as illustrated.

The use of resilient members 106 in the form of webs 178 formed from the plates 170 may provide one or more of the following advantages.

Where the resilient member is not in the form of a coil spring, it is not necessary to limit the material selection according to the requirements of coil spring fabrication. Consequently, materials that might not be fabricated easily into a coil spring, such as stainless steel, may be used for the resilient members in the form of webs 178. The use of stainless steel is particularly advantageous where the apparatus 100 is intended to meet a food-grade specification.

The webs 178 can be fashioned to provide a variety of stroke and spring rate characteristics based not only on the material selection, but also based on the amount of material removed/remaining (i.e., openings 176/webs 178). Consequently, a greater range of strokes and spring rates may be accommodated than may be the case with coil springs, which are conventionally manufactured in a standard set of sizes/rates. In fact, the greater range of strokes and spring rates possible provides for greater facility to customize a particular apparatus 100 to meet a customer's specific needs.

The manufacturing methods used to form openings 176 in the plates 170 may also be much simpler than the methods used to form coil springs. Forming the openings 176 (e.g., burning) in the plates 170 may also be more economically efficient and cost less.

In addition, the use of resilient members in the form of webs 178 permits the exciter 102 to provide high frequency (e.g., kHz range and above, or more particularly above 3600 Hz) vibration. Operation that provides high frequency, low stroke has a number of advantages.

High frequency vibration, for example, is better in certain applications, such as fines screening, and has a tendency to fluidize material and cause piled material to spread. High frequency may also be beneficial for use in conveying materials that are more fragile. High frequency operation may also lead to lower noise levels.

On the other hand, low stroke operation involves small dynamic forces. Consequently, the apparatus 100 can be disposed directly on the foundation without special requirements (e.g., without isolation springs 112), other than accepting the static load of the machine. Alternatively, the mechanism used for isolation may be much simpler (e.g., rubber pads). Further, the transfer points on and off the apparatus 100 require very little clearance, with smoother start up and shut down and lower risk of injury to the operator. This in turn may lead to a lesser potential for accidents to occur around the transfer points. Low stroke operation may also have advantages when conveying fragile materials.

Additional variants to the embodiment described above are possible.

For example, while the stroke and spring rate may be varied through the selection of materials and amount of material removed/retained to form the webs, it is also possible to add additional plates. These plates, like the plates 170, would have openings formed therethrough to define a particular stroke and spring rate. The plates would also be mounted with their thickness transverse to the path of travel. The additional plates would be mounted outwardly from the first set of plates 170.

Figure 4:
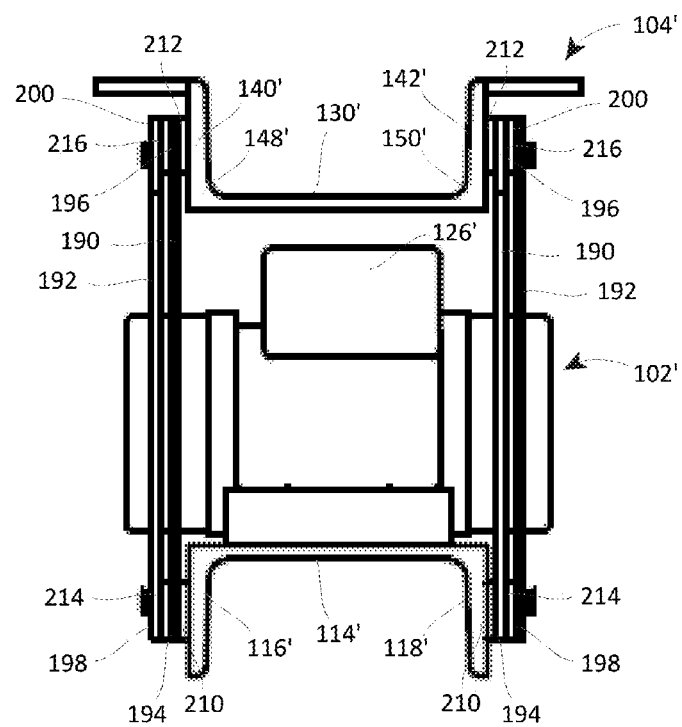
FIG. 4 is a rear end view of the vibratory apparatus of FIG. 3.

FIGS. 3 and 4 illustrate such an embodiment wherein multiple plates are included. Because this embodiment is similar in structure to that of FIGS. 1 and 2, those elements in common with the first embodiment are numbered similarly, except that those of the embodiment of FIGS. 3 and 4 are denoted with a prime. While two sets of plates are illustrated in the embodiment of FIGS. 3 and 4, it will be understood that additional sets of plates (e.g., three, four or more sets) may be used in a particular embodiment.

As seen in FIG. 3, the apparatus 100' includes an exciter 102' and a trough 104'. Similar to the embodiment of FIGS. 1 and 2, the exciter 102' includes a base 110' supported on isolation springs 112', the base 110' having a platform 114' with side walls 116', 118', and a motor 126' with shaft 120' with eccentric weights 124' disposed on the base 110' (and in particular the platform 114'). The trough 104' has a deck 130' and side walls 140', 142', the side walls 140', 142' coupled to the side edges 148', 150' of the deck 130'. The motor 126' may be coupled to a controller (not shown) as illustrated in FIG. 2.

As illustrated in FIG. 3 but better visualized in FIG. 4, the apparatus 100' also includes a set of inner plates 190 and a set of outer plates 192 disposed transversely outwardly from the inner plates 190. The inner plates 190 include a first end 194 that is coupled to one of the side walls 116', 118', and a second end 196 that is coupled to one of the side walls 140', 142'. Similarly, the outer plates 192 include a first end 198 that is coupled to one of the side walls 116', 118', and a second end 200 that is coupled to one of the side walls 140', 142'. The plates 190, 192 are joined to the exciter 102' and the trough 104' with fasteners (e.g., bolts/nuts, rivets, etc.), for example. As illustrated, common set of fasteners are used to attach both the inner plates 190 and the outer plates 192.

The inner plates 190 and outer plates 192 have openings 202, 204 and webs 206, 208, as best seen in FIG. 3. As illustrated, the inner plates 190 and the outer plates 192 have openings 202, 204 of generally the same shape and generally the same area in the plane of the respective plate 190, 192, with generally the same placement on the plate 190, 192. Consequently, the webs 206, 208 have generally the same shape, size and placement as well. Consequently, it would be expected that the spring characteristics of the individual plates 190, 192 are substantially the same.

According to other embodiments, the openings 202, 204 may vary, for example, as to one or more of their shape (e.g., oval, rectangular, etc.), their area in the plane of the plate 190, 192, and their placement on the plate 190, 192. Consequently, the webs 206, 208 would differ between the plates 190, 192. These differences may be used to vary the spring characteristics of the individual plates 190, 192, which thus could be used to vary the composite spring characteristics for the combined plates 190, 192 relative to what could be obtained simply by using plates 190, 192 with openings 202, 204 having similar shape, size and placement. Moreover, the plates 190, 192 may be made of different materials, so as to vary the spring characteristics of the plates 190, 192, and thus to vary the spring characteristics of the composite spring(s).

As can be seen in FIG. 4, the plates 190, 192 may be spaced from the base 110' and the trough 104', as well as from each other, according to certain embodiments. In particular, the illustrated embodiment includes spacers 210 that are disposed between the first end 194 of the inner plates 190 and the side walls 116', 118' of the base 110', and spacers 212 are disposed between the second end 196 of the inner plates 190 and the side walls 140', 142' of the trough 104' (i.e., to either side of the deck 130'). In a similar fashion, spacers 214 are disposed between the first ends 194, 198 of the plates 190, 192 and spacers 216 are disposed between the second ends 196, 200 of the plates 190, 192.

According to still another embodiment, one or more of the plates may be formed as a single piece (i.e., integrally) with the side walls of the base 110, 110' (and thus the exciter 102, 102'). Such an embodiment would eliminate the need to fasten the first ends of the plates (and the first ends of the webs) to the side walls of the base 110, 110'. According to still another embodiment, one or more of the plates may be formed as a single piece (i.e., integrally) with the side walls of the trough 104, 104'. Such an embodiment would eliminate the need to fasten the second ends of the plates (and the second ends of the webs) to the side walls of the trough 104, 104'. In fact, a single embodiment may have the plates formed as a single piece with the side walls of the base 110, 110' and the side walls of the trough 104, 104'.

Figure 5:
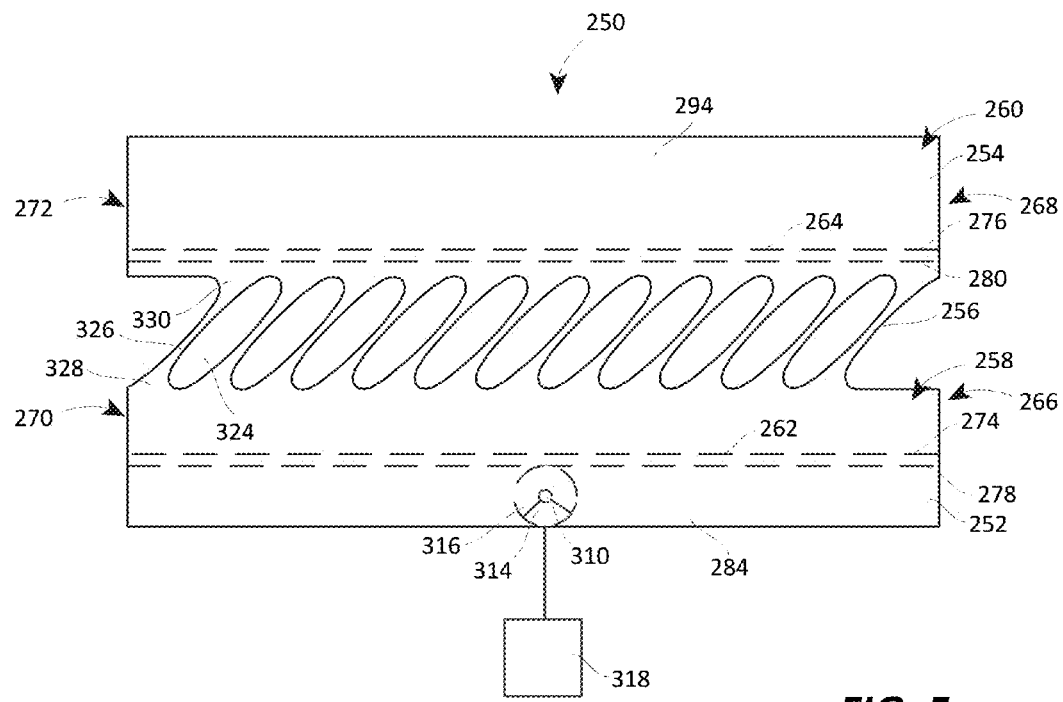
FIG. 5 is a side view of an embodiment of a vibratory apparatus having multiple decks.
Figure 6:
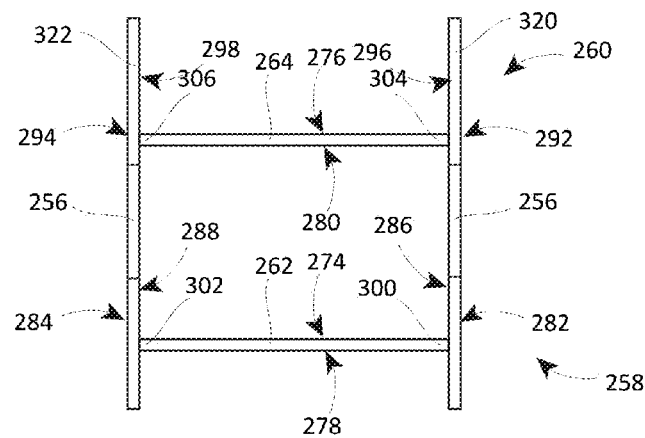
FIG. 6 is a rear end view of the vibratory apparatus of FIG. 5.

A linear, multi-deck apparatus 250 according to embodiments of the present disclosure is illustrated in FIGS. 5 and 6. This embodiment also illustrates an embodiment that would be structurally and operationally similar to the one-deck apparatuses 100, 100' if the plates 170, 190 were formed as a single piece with the side walls of the base 110, 110' and the trough 104, 104'.

The embodiment of a multi-deck apparatus 250 of FIGS. 5 and 6 is a two-mass vibratory apparatus, including a first mass 252 and a second mass 254. Connected between the first mass 252 and the second mass 254 are a number of resilient members 256 (or reactor springs), which are formed from structural elements of the apparatus 250.

Each mass 252, 254 defines a trough 258, 260. Each trough 258, 260 includes a deck 262, 264. As illustrated, the second deck 264 is above, or at a higher elevation than the first deck 262 relative to a reference surface. The reference surface may be defined by a foundation, which in turn may be the ground story of a building or an upper story of such a structure. As such, the second deck 264 may be referred to as the top deck 264, and the first deck 262 may be referred to as the bottom deck 262.

Each deck 262, 264 has a first end 266, 268 and a second end 270, 272. Material may be moved along each deck 262, 264 with a path of travel between a first point and a second point, e.g., between the first and second ends 266, 268, 270, 272. The deck 262, 264 also may have opposing surfaces, which for ease of illustration may be referred to as a first, or top, surface 274, 276 and a second, or bottom, surface 278, 280, considering the orientation of the apparatus 250 in FIGS. 5 and 6.

As was the case above, the top surfaces 274, 276 of the decks 262, 264 may be treated or may have one or more protective layers disposed thereon to protect the deck 262, 264 as material is moved between the first and second ends 266, 268, 270, 272. The deck 262, 264 may have openings or passages that extend between the surfaces 274, 276, 278, 280 to permit the separation of material moving over the top surfaces 274, 276 of the decks 262, 264. According to certain embodiments, the deck 264 may have openings or passages, while the deck 262 does not; alternatively, the deck 264 may have openings or passages of a particular size or shape, and the deck 262 may have openings or passages of a different size or shape, such that one size of materials passes along deck 264, a smaller sized material passes along deck 262, and a still smaller sized material passes through the deck 262.

In the illustrated embodiment, the first ends 266, 268 of the decks 262, 264 are at substantially the same elevation as the second end 270, 272 of the decks 262, 264 relative to a reference surface (i.e., the deck is horizontal). The reference surface may be defined by a foundation, which in turn may be the ground story of a building or an upper story of such a structure. According to other embodiments, the first end 266, 268 of the deck 262, 264 may be above or below the second end 270, 272 of the deck 262, 264 (i.e., the deck 262, 264 is tilted or sloped, for example to allow gravity to assist or retard motion of material along the deck 262, 264). Further, it is not necessary that the slope or inclination of the deck 262 be the same or in the same direction as that of the deck 264.

The trough 258 may also include a first side wall 282 and a second side wall 284 extending or depending from the first end 266 to the second end 270, although not all embodiments of the apparatus 250 necessarily require such side walls 282, 284 (e.g., the side walls 282, 284 may not extend or depend from the first end 266 to the second end 270). The first and second side walls 282, 284 have facing surfaces 286, 288 that with the surface 274 of the deck 262 and the surface 280 of the deck 264 define an closed-topped volume.

The trough 260 may also include a first side wall 292 and a second side wall 294 extending or depending from the first end 268 to the second end 272, although not all embodiments of the apparatus 250 necessarily require such side walls 292, 294 (e.g., the side walls 292, 294 may not extend or depend from the first end 268 to the second end 272). The first and second side walls 292, 294 have facing surfaces 296, 298 that with the surface 276 of the deck 264 define an open-topped volume (although other embodiments may include a hood.

The decks 262, 264 are disposed between the first and second side walls 282, 284, 292, 294 and are coupled to the first and second side walls 282, 284, 292, 294. In this regard, the decks 262, 264 are coupled to the side walls 282, 284, 292, 294 when the deck and side walls are directly connected or indirectly connected (for example, when the side walls are connected by cross-members and the deck is connected to the cross-members). As illustrated, the deck 262 has a first edge 300 that is coupled to the first side wall 282 (specifically, the inner-facing surface 286) and a second edge 302 that is coupled to the second side edge 284 (specifically, the inner-facing surface 288). Similarly, the deck 264 has a first edge 304 that is coupled to the first side wall 292 (specifically, the inner-facing surface 296) and a second edge 306 that is coupled to the second side edge 294 (specifically, the inner-facing surface 298).

As illustrated in FIG. 5, the apparatus 250 may also include a shaft 310 with a shaft axis disposed transverse to the path of travel along the troughs 258, 260. The shaft 310 may be coupled to the mass 252, and particularly the surface 278 of the deck 262, and one or more eccentric or eccentric weights 314 may be coupled to the shaft 310. It will be recognized that an alternative arrangement would be for the assembly of shaft 310 and weights 314 to be coupled instead to the mass 254, as either option is acceptable. According to certain embodiments, the shaft 310 is the shaft of an electric motor 316, which motor 316 is coupled (e.g., by fasteners) to the deck 264. According to other embodiments, the shaft 310 is coupled to a shaft of an electric motor, which motor is mounted off the apparatus (e.g., to the side of the apparatus 250). The shaft 310, weights 314 and motor 316 have been omitted from FIG. 6 to simplify the discussion of certain other elements of the apparatus 250.

According to other embodiments, a plurality of shafts may be used, each with eccentric weights mounted thereon, with each of the shafts being defined by one of a plurality of motors. In addition, the motor 316 may be electrically coupled to a controller 318, which controller 318 may include a microprocessor and memory. The controller 318 may be configured (e.g., programmed) to control the operation of the motor 316 (and thus the shaft 310) to vary the motion of the material on the decks 262, 264. According to certain embodiments, the masses 252, 254 may stroke 180 degrees out of phase to each other, but may convey materials in the same direction (e.g., from ends 266, 268 to ends 270, 272).

As illustrated, the side walls 282, 292 and the side walls 284, 294 are formed from a single plate 320, 322. The first and second plates 320, 322 may have a plurality of openings 324 formed in through the plates 320, 322. The plurality of openings 324 may be generally disposed along a linear path from the first ends 266, 268 of the decks 262, 264 to the second ends 270, 272 of the decks 262, 264. In particular, the openings 324 may be disposed such that the openings are formed in the plates 320, 322 between the attachment points between first and second deck sections 262, 264 and the plates 320, 322 (and thus the side walls 282, 284, 292, 294).

The openings 324 define a plurality of webs 326 that join the portion of the first side wall 282 and second side wall 284 supporting the first deck section 262 with the portions of the first side wall 292 and second side wall 294 supporting the second deck section 264. These webs 326 have a thickness that is disposed transverse to the path of travel of material along the decks 262, 264 between the first ends 266, 268 and the second end 270, 272. According to certain embodiments, the webs 326 may also have a width that is comparable to their thickness, both of which dimensions are smaller than the length of the webs 326 from one end of the web to the other. In fact, much of the discussion above relative to the webs 178 applies with equal force to the webs 326.

The webs 326 thus define a plurality of resilient members or springs coupled between the side wall portions 282, 284 supporting the first deck section 262 and the side wall portions 292, 294 supporting the second deck section 264. Alternatively, the side wall portions 282, 284 and first deck section 262 may be referred to as the first tier, and the side wall portions 292, 294 and the second deck section 264 may be referred to as the second tier. As such, the webs 326 may be described as being coupled to the first tier at a first end 328 and the second tier at a second end 330.

While an embodiment having a first and second tier has been illustrated, it will be recognized that other embodiments of the conveyor according to the present disclosure may include additional decks defining additional tiers (e.g., third, fourth, fifth and sixth tiers). According to such embodiments, the plurality of webs may be disposed between the first and second tiers, such that the first tier defines the first mass and the second through sixth tiers define the second mass. As one alternative, the webs may be defined between the third and fourth tiers, such that the first, second, and third tiers define the first mass, and the fourth, fifth and sixth tiers define the second mass. Other alternatives are possible.

In addition, according to certain embodiments, it may be possible to attach additional plates outside the side walls of an apparatus, such as illustrated in FIGS. 5 and 6, to vary the spring characteristics. In this regard, the additional plates may be added as is illustrated in the embodiment of FIGS. 3 and 4, except that the inner set of plates would be defined by the side walls having openings therethrough to define the webs acting as springs, such as is illustrated in FIGS. 5 and 6. The outer set of plates may not depend or extend to the top and bottom of the side walls, but may be located only in that region of the apparatus that substantially overlies the webs formed in the side walls of the apparatus.

For that matter, it may be possible to design a multi-tier apparatus wherein the first and second tiers are coupled to plates, such as are illustrated in FIGS. 1-4, that are in turn secured to side walls, instead of forming the webs from plates that are formed as one piece (i.e., integrally) with the side walls.

The multi-deck or multi-tier embodiments of FIGS. 5 and 6 are linear between the opposing ends. On the other hand, multi-tier embodiments may be defined for an apparatus having a curved deck. Certain multi-tier embodiments may be defined for an apparatus having a spiral deck. Preferably, the spiral deck has a continuous (or substantially continuous) deck between an inlet end and an outlet end.

Figure 7:
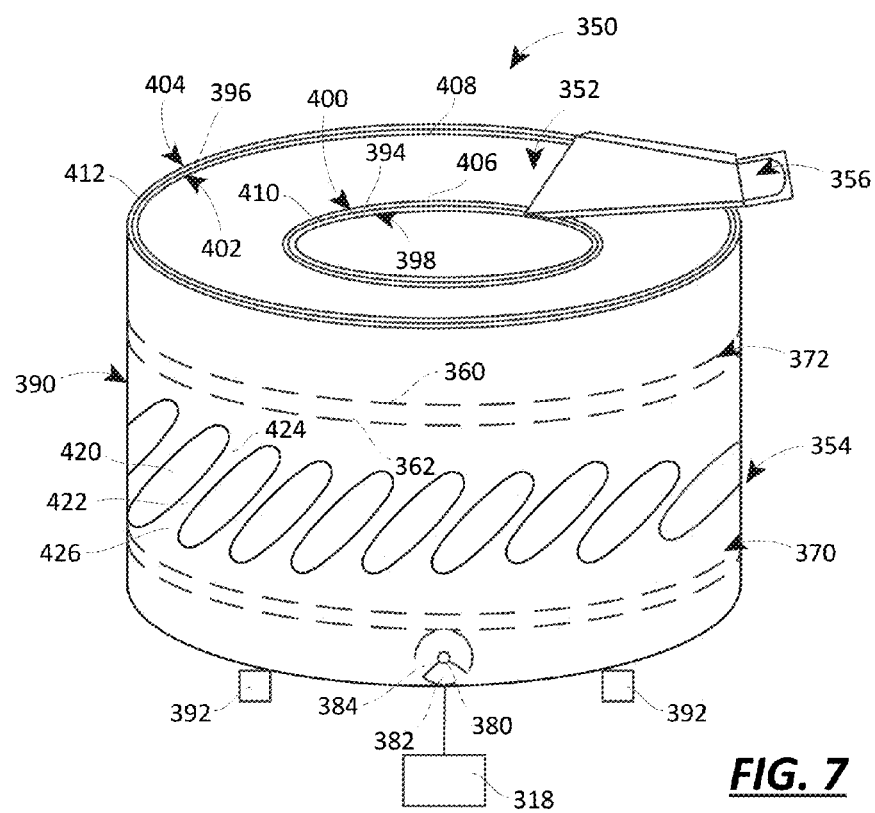
FIG. 7 is a perspective view of an embodiment of a vibratory apparatus having a spiral deck.
Figure 8:
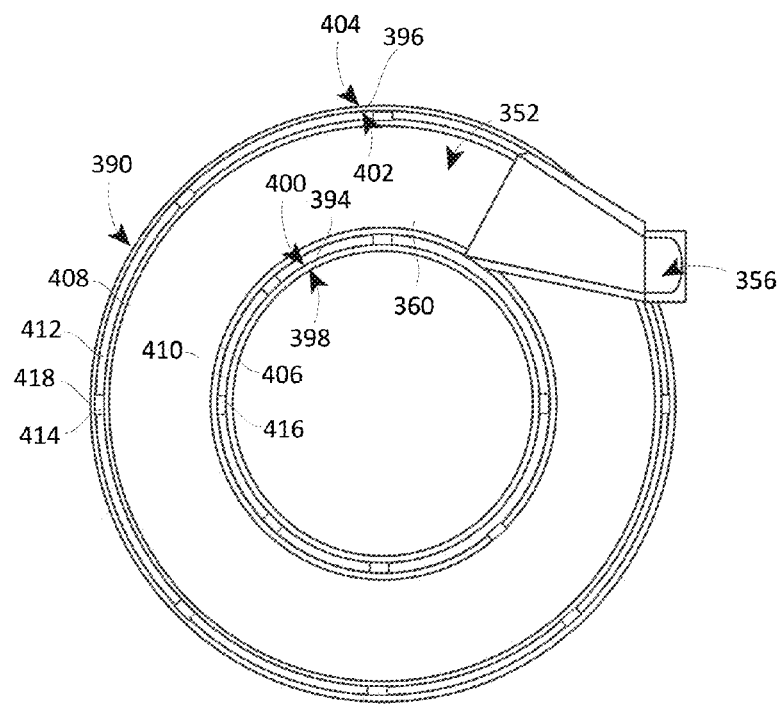
FIG. 8 is a plan view of the vibratory apparatus of FIG. 7.

A spiral conveyor 350 is illustrated in FIGS. 7 and 8. Spiral conveyors are often used to heat or cool work pieces or granular material. For example, red-hot castings (which may have a temperature of approximately 1000 degrees F. or more) are fed into the spiral conveyor. Cool air is directed over the castings as the castings travel up the spiral, thereby to reduce the temperature of the castings.

The spiral conveyor 350 includes a curved deck 352 that extends between a first end 354 and a second end 356. In particular, the curved deck 352 may have a spiral shape, and thus the conveyor 350 may be referred to as a spiral conveyor. As used herein, spiral includes helical and helicoid shapes.

The curved deck 352 may have opposing surfaces, which for ease of illustration may be referred to as a first, or top, surface 360 and a second, or bottom, surface 362. In operation, material may move in a curved path of travel over the top surface 360 of the spiral deck 352 between the first end 354 and the second end 356 of the deck 352. The top surface 360 of the spiral deck 352 may be treated or may have one or more protective layers disposed thereon to protect the deck 352 as material is moved between the first and second ends 354, 356.

As material follows a curved path of travel along the spiral deck 352, the elevation of the material may increase or decrease relative to a reference surface. The reference surface may be defined by a foundation, which in turn may be the ground story of a building or an upper story of such a structure. As illustrated, the spiral deck 352 may increase in elevation from the first end 354 to the second end 356, such that a first deck section 370 may be disposed below a second deck section 372 relative to the reference surface on which the spiral conveyor 350 is disposed. As illustrated, the first end 354 of the deck 352 may be designated the lowest point or elevation, while the second end 356 of the deck 352 may be designated the highest point or elevation.

As illustrated, the first deck section 370 is joined to the second deck section 372 to form a substantially continuous surface between the first end 354 and the second end 356 of the deck 352. Moreover, given the increasing elevation of successive deck sections 370, 372 as described relative to FIGS. 1 and 2, the top surface 360 of the first section 370 faces the bottom surface 362 of the second section 372.

A shaft 380 with eccentric weights 382 mounted on the shaft 380 is coupled to the first section 370. The shaft 380 may be defined by a motor 384, similar to the embodiments illustrated in FIGS. 1-6. While only one assembly of shaft 380, weights 382, and motor 384 is illustrated, multiple assemblies will likely be mounted to the first section 370. According to certain embodiments, the action of the assembly of shaft 380, weights 382, and motor 384 moves material, such as work pieces (e.g., hot castings), from the first end 354 to the second end 356 (i.e., upward or vertically upward). According to other embodiments, the assembly/assemblies may cause material to move along the top surface 360 of the spiral deck 352 from the second end 356 to the first end 354, so that the material is conveyed vertically downward along the spiral deck 352.

The spiral deck 352 may be coupled to a frame 390 that is supported on the reference surface. In particular, the frame 390 may be supported on the reference surface by resilient members 392, such as coil springs or marshmallow springs, which resilient members or springs 392 may also be referred to as isolation members or springs. However, the springs 392 may be omitted according to other embodiments, and are considered optional in the illustrated embodiment.

The frame 390 may include a cylindrical inner wall 394 and a cylindrical outer wall 396. The cylindrical inner wall 394 may have a first diameter, and the cylindrical outer wall 396 may have a second diameter. The first diameter may be smaller than the second diameter, such that the inner wall 394 may be disposed within the outer wall 396. As illustrated, the inner wall 394 and the outer wall 396 may have a common center, although this need not be the case according to all embodiments.

The inner wall 394 and the outer wall 396 have inner-facing and outer-facing surfaces. For example, the inner wall 394 has an inner-facing surface 398 and an outer-facing surface 400, and the outer wall 396 has an inner-facing surface 402 and an outer-facing surface 404. As illustrated, the inner-facing surface 402 of the outer wall 396 faces the outer-facing surface 400 of the inner wall 394.

The spiral deck 352 may have an inner edge 406 and an outer edge 408, the inner edge 406 being closer to the center in a radial direction than the outer edge 408 (alternatively, the outer edge 408 is further from the center in a radial direction than the inner edge 406). According to certain embodiments, a diameter taken at the inner edge 406 may be greater than or equal to the first diameter of the cylindrical inner wall 394, and a diameter taken at the outer edge 408 may be less than or equal to the second diameter of the cylindrical outer wall 396.

The spiral deck 352 is disposed between and coupled to the inner wall 394 and the outer wall 396.

According to certain embodiments, the spiral deck may be coupled to the inner and outer walls 394, 396 directly. According to this embodiment, the inner edge 406 of the spiral deck 352 is joined to the outer-facing surface 400 of the inner wall 394, and the outer edge 408 of the spiral deck 352 is joined to the inner-facing surface 402 of the outer wall 396. The edges 406, 408 and surfaces 400, 402 may be joined by welding the edges 406, 408 and surfaces 400, 402, for example. As an alternative, the edges 406, 480 may be coupled to the surfaces 400, 402 with clamps, as in U.S. Pat. No. 7,296,951, the disclosure of which is incorporated herein for all purposes According to the illustrated embodiment in FIG. 8, the inner and outer edges 406, 408 of the spiral deck 352 are spaced from the inner and outer walls 394, 396. That is the inner edge 406 of the deck 352 is spaced from the outer-facing surface 400 of the inner wall 394, and the outer edge 408 of the deck 352 is spaced from the inner-facing surface 402 of the outer wall 396 to form a first gap 410 between the inner edge/outer-facing surface 406, 400 and a second gap 412 between the outer edge/inner-facing surface 408, 402. In such a circumstance, cross-supports 414 may be joined at a first end 416 to the inner wall 394 and at a second end 418 to the outer wall 396, and the bottom surface 362 of the spiral deck 352 may be disposed on the cross-supports 414. In fact, the bottom surface 362 of the spiral deck 352 may be directly connected (e.g., with fasteners) to the cross-supports 414. According to such an embodiment, guide rails may be disposed at the inner and outer edges 406, 408 of the spiral deck 352.

As illustrated, the inner and outer walls 394, 396 may have a plurality of openings 420 formed in through the inner and outer walls 394, 396 (of which only the openings 420 in the outer wall 396 are visible in FIG. 7). The plurality of openings 420 may be formed generally along a curved or spiral path through the inner and outer walls 394, 396. In particular, the openings 420 may be disposed such that the openings 420 are formed in the inner and outer walls 394, 396 between the attachment points between first and second deck sections 370, 372 and the inner and outer walls 394, 396.

The openings 420 define a plurality of webs 422 that join the portion of the inner wall 394 and outer wall 396 supporting the first deck section 370 with the portions of the inner wall 394 and outer wall 396 supporting the second deck section 372. These webs 422 have a thickness that is disposed transverse to the path of travel of material along the curved deck 352 between the first end 354 and the second end 356 that is much smaller than the length and width of the walls 394, 396. The webs 422 may also have a width that is comparable to their thickness, both of which dimensions are smaller than the length of the webs 422 from one end of the web to the other. In fact, much of the discussion above relative to the webs 178 applies with equal force to the webs 422.

The webs 422 thus define a plurality of resilient members or springs coupled between portions or sections of the inner and outer wall 394, 396 supporting the first deck section 370 and the portions or sections of inner and outer wall 394, 396 supporting the second deck section 372. See FIG. 7. Furthermore, the inner and outer wall 394, 396 and first deck section 370 may be referred to as the first tier, and the inner and outer wall 394, 396 and the second deck section 372 may be referred to as the second tier. In particular, the first and second tier may be defined such that the length of the path of travel from the first end 354 to the junction between the first and second tiers is the same as the junction between the first and second tiers and the second end 356. As such, the webs 422 may be described as being coupled to the first tier at a first end 424 and the second tier at a second end 426.

According to such embodiments, the shafts/weights 380, 382 may be coupled to the first tier directly, for example by providing cross-members that connect the inner and outer walls 394, 396 below the bottom of the lowest portion of the spiral deck 352 and connecting the shafts/weights 380, 382 directly to those cross-members. The assembly of shaft/weights 380, 382 and the first tier of the conveyor may thus define a first mass of a two-mass vibratory conveyor, while the second tier defines the second mass of the two-mass vibratory conveyor.

While an embodiment having a first and second tier has been illustrated, it will be recognized that other embodiments of the spiral conveyor according to the present disclosure may include additional tiers (e.g., third, fourth, fifth and sixth tiers). According to such embodiments, the plurality of webs may be disposed between the first and second tiers, such that the first tier defines the first mass and the second through sixth tiers define the second mass. As one alternative, the webs may be defined between the third and fourth tiers, such that the first, second, and third tiers define the first mass, and the fourth, fifth and sixth tiers define the second mass. Other alternatives are possible.

A vibratory conveyor according to the above embodiments thus may provide one or more of the following advantages, some of which also may have been mentioned above. The cost of using resilient members in the form of webs, such as may be formed by forming an opening in a plate or side wall, may be much less than the cost of using coil springs, which are formed using a more complicated manufacturing process. In addition, materials may be used for the resilient members in the form of webs that are not suitable for use in coil springs, such as stainless steel. The resilient members in the form of webs both provide a particular spring rate and limit the direction of the motion, and consequently provide a reduced cost relative to apparatuses using coil springs, because a leg or linkage is required in such coil spring installations to limit the direction of motion and the additional equipment increases the overall cost. The resilient members in the form of webs disposed as the sides of the apparatus (i.e., parallel to the direction of motion instead of transverse) permit a less complicated, costly installation and limit or eliminate the localized stresses involved with the use of slat springs. For example, if it is desired to vary the spring characteristics, one need only attach additional plates, which plates are conveniently disposed outside of the bulk of the apparatus. When used as a two-mass vibratory apparatus, a smaller motor may be used than with vibratory apparatuses using a brute force arrangement with the motor directly driving the trough. The two-mass arrangement may also provide better load response and smoother start and stop, while still providing high frequency performance. In addition, brute force apparatuses can be limited in length by the effect of vertical deflections. The spring according to the present disclosure enables a design better able to distribute driving forces down the length of the unit. This may reduce cantilever length, unintended deflections, and stress making it possible to design longer high frequency units While certain equipment has been described relative to the illustrated embodiments, additional equipment could be included as well. For example, relative to the spiral conveyor, the cross-members 414 may be hollow and fitted with one or more nozzles. Cooling air, generated by a fan for example, may be passed through the hollow cross-members and nozzles, and directed on the material passing along the deck to cool the material. See, e.g., U.S. Pat. No. 7,540,694, the disclosure of which is incorporated herein for all purposes. The spiral conveyor also be configured to provide a fines collection system, such as also is described in U.S. Pat. No. 7,540,694, the disclosure of which is incorporated herein for all purposes.

Additional embodiments/aspects are as follows:

Embodiment 1

A vibratory apparatus comprising:
a first mass;
a second mass,
at least one of the first mass and the second mass having a deck with a path of travel between a first point and a second point along the deck;
at least one resilient member in the form of a plate having a thickness, the plate coupled at a first end to the first mass and at a second end to the second mass with the thickness disposed transverse to the path of travel along the deck, the plate having at least one opening formed therethrough to form a web having a spring characteristic;
a shaft coupled to one of the first mass and the second mass, the shaft having at least one eccentric weight coupled thereto; and
a motor coupled to the shaft.

Embodiment 2

The vibratory apparatus according to embodiment 1, wherein the first mass has a platform, the second mass has a deck with a path of travel between a first point and a second point along the deck, the plate is coupled at the first end to the platform and at the second end to the deck, and the shaft is coupled to the platform.

Embodiment 3

The vibratory apparatus according to embodiment 2, wherein the platform has side walls and the second mass has side walls coupled to either side of the deck, and the plate is coupled at the first end to one of the side walls of the platform and the second end to one of the side walls of the second mass.

Embodiment 4

The vibratory apparatus according to embodiment 3, wherein the at least one resilient member comprises at least two plates, each plate coupled at a first end to one of the side walls of the platform and at a second end to one of the side walls of the second mass.

Embodiment 5

The vibratory apparatus according to embodiment 4, wherein each of the at least two plates are coupled to a different one of the side walls of the platform and the side walls of the second mass.

Embodiment 6

The vibratory apparatus according to embodiment 4, wherein the at least two plates comprise an inner plate and an outer plate disposed transversely outwardly from the inner plate, the inner plate and the outer plate each having a first end coupled to the first mass and a second end to the second mass with the thickness disposed transverse to the path of travel along the deck, each plate having at least one opening formed therethrough to form a web having a spring characteristic.

Embodiment 7

The vibratory apparatus according to embodiment 1, wherein each of the first mass and the second mass has a deck with a path of travel between a first point and a second point along the deck, and the plate has its thickness disposed transverse to the path of travel along the deck.

Embodiment 8

The vibratory apparatus according to embodiment 7, wherein each of the first mass and the second mass has side walls coupled to the deck at either side, and the plate is coupled at the first end to the deck of the first mass and at the second end to the deck of the second mass.

Embodiment 9

The vibratory apparatus according to embodiment 7 or 8, wherein the at least one resilient member comprises at least two plates, each plate coupled at a first end to the first mass and at a second end to the second mass with the thickness of the plate disposed transverse to the path of travel along the decks, each plate having at least one opening formed therethrough to form a web having a spring characteristic.

Embodiment 10

The vibratory apparatus according to embodiment 9, wherein the at least two plates define an inner plate and an outer plate, the inner plate and the outer plate having a cylindrical form with a diameter of the inner plate being smaller than a diameter of the inner plate and the first and second decks disposed between and coupled to the inner and outer plates.

Embodiment 11

The vibratory apparatus according to any one of embodiments 7-10, wherein the deck of the first mass and the deck of the second mass are defined by a single continuous spiral deck.

Embodiment 12

The vibratory apparatus according to any of the preceding embodiments, wherein the plate has a plurality of openings formed therethrough to form a plurality of webs.

Embodiment 13

The vibratory apparatus according to any of the preceding embodiments, wherein the openings and the webs are disposed at an angle to the deck.

Embodiment 14

A vibratory apparatus comprising:
a trough comprising deck with a path of travel between a first point and a second point along the deck;
an exciter comprising a platform, and a shaft disposed on the platform with a shaft axis disposed transverse to the path of travel, and at least one eccentric weight coupled to the shaft; and
at least one resilient member in the form of a plate having a thickness, the plate coupled at one end to the platform and at a second end to the deck, the plate having a thickness disposed transverse to the path of travel along the deck, and at least one opening formed therethrough to form a web having a spring characteristic.

Embodiment 15

The vibratory apparatus according to embodiment 14, wherein the at least one resilient member comprises at least two plates, an inner plate and an outer plate disposed transversely outwardly from the inner plate, the inner plate and the outer plate each having a first end coupled to the platform and a second end to the deck with the thickness disposed transverse to the path of travel along the deck, each plate having at least one opening formed therethrough to form a web having a spring characteristic.

Embodiment 16

A vibratory apparatus comprising:
a first mass comprising a first deck with a path of travel between a first point and a second point along the first deck;
a second mass comprising a second deck with a path of travel between a first point and a second point along the second deck;
a shaft coupled to the first mass and at least one eccentric weight coupled to the shaft; and
at least one resilient member in the form of a plate having a thickness, the plate coupled at a first end to the first deck and at a second end to the second deck, the plate having a thickness disposed transverse to the path of travel along the first and second decks, the plate having at least one opening formed therethrough to form a web having a spring characteristic.

Embodiment 17

The vibratory apparatus according to embodiment 16, wherein the first mass comprises side walls coupled to either side of the first deck, the second mass comprises side walls attach to either side of the second deck, and the plate is coupled at the first end to one of the side walls of the first mass and at the second end to one of the side walls of the second mass.

Embodiment 18

The vibratory apparatus according to embodiment 17, wherein the first deck and the second deck are defined by a single continuous spiral deck.

Embodiment 19

The vibratory apparatus according to any one of embodiments 16-18, further comprising a motor coupled to the one shaft, the motor coupled to the first mass.

Embodiment 20

The vibratory apparatus according to any one of embodiments 16-19, wherein the plate has a plurality of openings formed therethrough to form a plurality of webs.

Although the preceding text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A vibratory apparatus comprising:
a first mass;
a second mass,
at least one of the first mass and the second mass having a deck with a path of travel between a first point and a second point along the deck;
at least one resilient member in the form of a plate having a thickness, the plate coupled at a first end to the first mass and at a second end to the second mass with the thickness disposed transverse to the path of travel along the deck, the plate having at least one opening formed therethrough to form a web having a spring characteristic;
a shaft coupled to one of the first mass and the second mass, the shaft having at least one eccentric weight coupled thereto; and
a motor coupled to the shaft.

2. The vibratory apparatus according to claim 1, wherein the first mass has a platform, the second mass has a deck with a path of travel between a first point and a second point along the deck, the plate is coupled at the first end to the platform and at the second end to the deck, and the shaft is coupled to the platform.

3. The vibratory apparatus according to claim 2, wherein the platform has side walls and the second mass has side walls coupled to either side of the deck, and the plate is coupled at the first end to one of the side walls of the platform and the second end to one of the side walls of the second mass.

4. The vibratory apparatus according to claim 3, wherein the at least one resilient member comprises at least two plates, each plate coupled at a first end to one of the side walls of the platform and at a second end to one of the side walls of the second mass.

5. The vibratory apparatus according to claim 4, wherein each of the at least two plates are coupled to a different one of the side walls of the platform and the side walls of the second mass.

6. The vibratory apparatus according to claim 4, wherein the at least two plates comprise an inner plate and an outer plate disposed transversely outwardly from the inner plate, the inner plate and the outer plate each having a first end coupled to the first mass and a second end to the second mass with the thickness disposed transverse to the path of travel along the deck, each plate having at least one opening formed therethrough to form a web having a spring characteristic.

7. The vibratory apparatus according to claim 1, wherein each of the first mass and the second mass has a deck with a path of travel between a first point and a second point along the deck, and the plate has its thickness disposed transverse to the path of travel along the deck.

8. The vibratory apparatus according to claim 7, wherein each of the first mass and the second mass has side walls coupled to the deck at either side, and the plate is coupled at the first end to the deck of the first mass and at the second end to the deck of the second mass.

9. The vibratory apparatus according to claim 7, wherein the at least one resilient member comprises at least two plates, each plate coupled at a first end to the first mass and at a second end to the second mass with the thickness of the plate disposed transverse to the path of travel along the decks, each plate having at least one opening formed therethrough to form a web having a spring characteristic.

10. The vibratory apparatus according to claim 9, wherein the at least two plates define an inner plate and an outer plate, the inner plate and the outer plate having a cylindrical form with a diameter of the inner plate being smaller than a diameter of the inner plate and the first and second decks disposed between and coupled to the inner and outer plates.

11. The vibratory apparatus according to claim 7, wherein the deck of the first mass and the deck of the second mass are defined by a single continuous spiral deck.

12. The vibratory apparatus according to claim 1, wherein the plate has a plurality of openings formed therethrough to form a plurality of webs.

13. The vibratory apparatus according to claim 1, wherein the openings and the webs are disposed at an angle to the deck.

14. A vibratory apparatus comprising:
a trough comprising deck with a path of travel between a first point and a second point along the deck;
an exciter comprising a platform, and a shaft disposed on the platform with a shaft axis disposed transverse to the path of travel, and at least one eccentric weight coupled to the shaft; and
at least one resilient member in the form of a plate having a thickness, the plate coupled at one end to the platform and at a second end to the deck, the plate having a thickness disposed transverse to the path of travel along the deck, and at least one opening formed therethrough to form a web having a spring characteristic.

15. The vibratory apparatus according to claim 14, wherein the at least one resilient member comprises at least two plates, an inner plate and an outer plate disposed transversely outwardly from the inner plate, the inner plate and the outer plate each having a first end coupled to the platform and a second end to the deck with the thickness disposed transverse to the path of travel along the deck, each plate having at least one opening formed therethrough to form a web having a spring characteristic.

16. A vibratory apparatus comprising:
a first mass comprising a first deck with a path of travel between a first point and a second point along the first deck;
a second mass comprising a second deck with a path of travel between a first point and a second point along the second deck;
a shaft coupled to the first mass and at least one eccentric weight coupled to the shaft; and
at least one resilient member in the form of a plate having a thickness, the plate coupled at a first end to the first deck and at a second end to the second deck, the plate having a thickness disposed transverse to the path of travel along the first and second decks, the plate having at least one opening formed therethrough to form a web having a spring characteristic.

17. The vibratory apparatus according to claim 16, wherein the first mass comprises side walls coupled to either side of the first deck, the second mass comprises side walls attach to either side of the second deck, and the plate is coupled at the first end to one of the side walls of the first mass and at the second end to one of the side walls of the second mass.

18. The vibratory apparatus according to claim 17, wherein the first deck and the second deck are defined by a single continuous spiral deck.

19. The vibratory apparatus according to claim 16, further comprising a motor coupled to the one shaft, the motor coupled to the first mass.

20. The vibratory apparatus according to claim 16, wherein the plate has a plurality of openings formed therethrough to form a plurality of webs.

\* \* \* \* \*